Jan. 22, 1963 C. O. KUFFER 3,074,601
AEROSOL VALVE ASSEMBLY
Filed Sept. 17, 1959 4 Sheets-Sheet 4
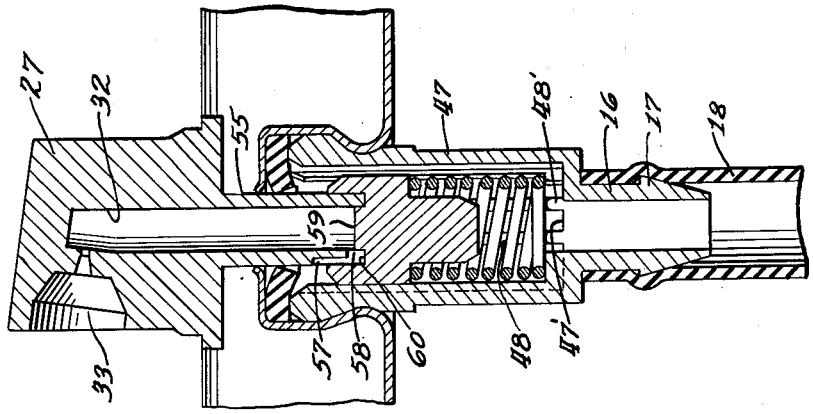
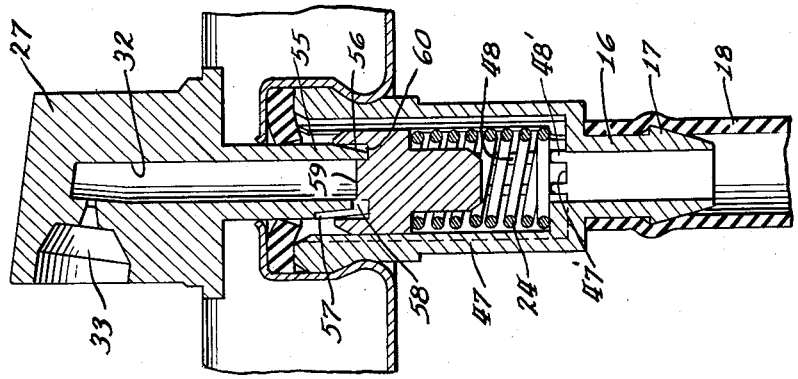
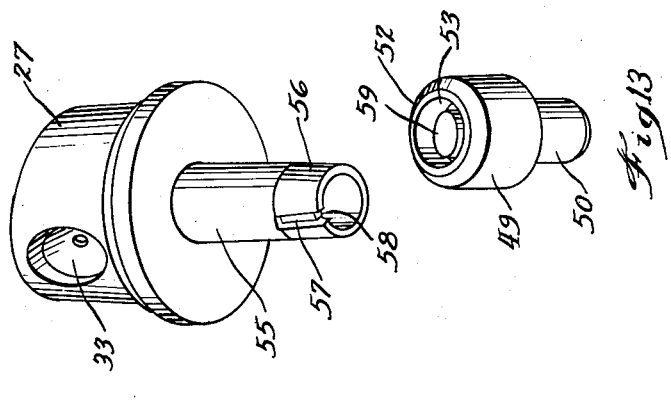
Inventor
Clarence O. Kuffer
By Schnieder, Dressler, Goldsmith & Clement
Attorneys United States Patent Office 3,074,601
Patented Jan. 22, 1963

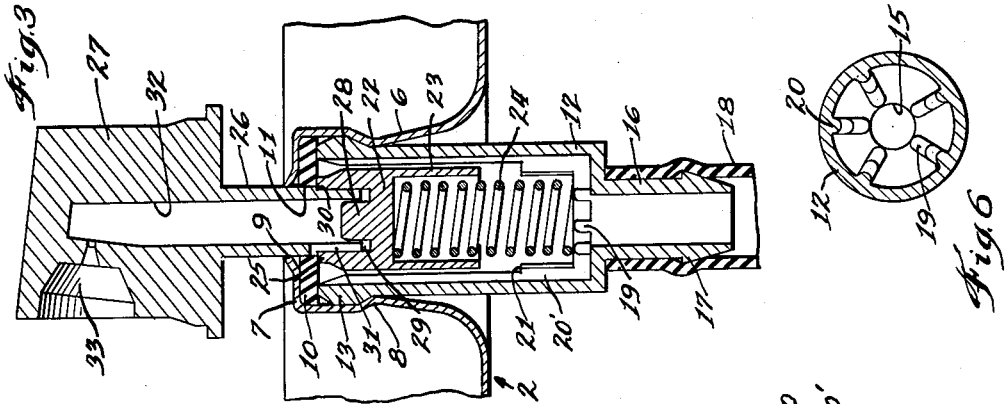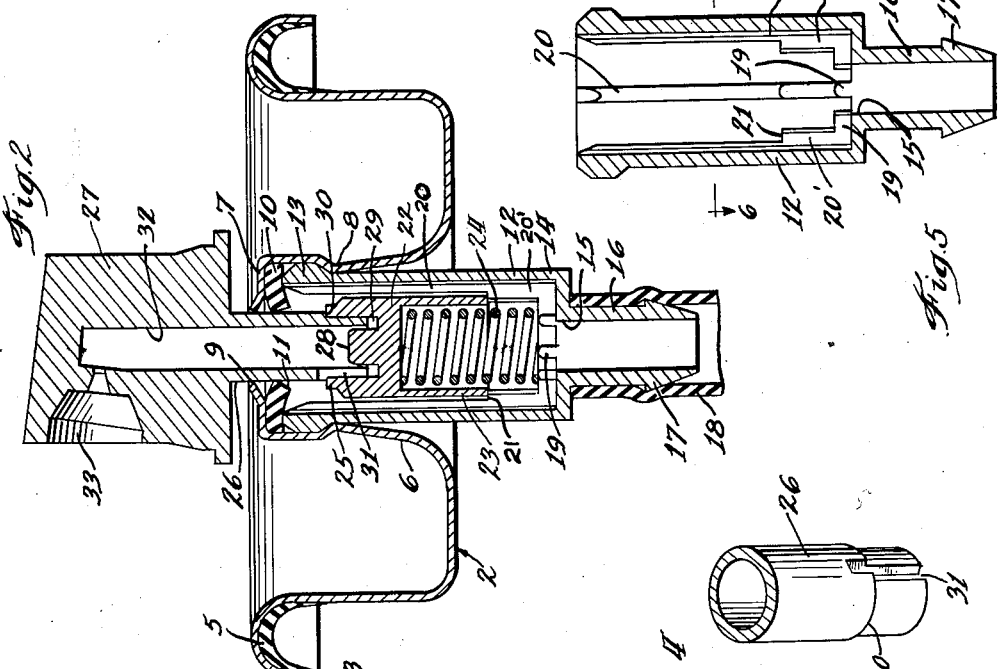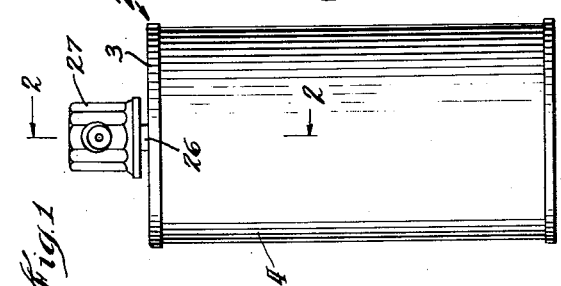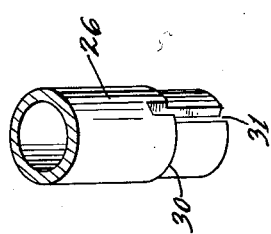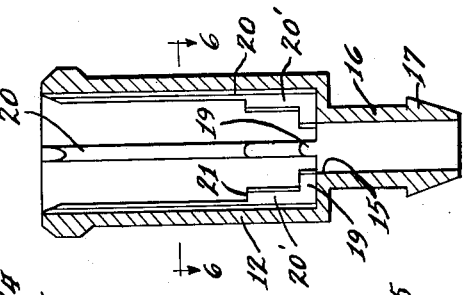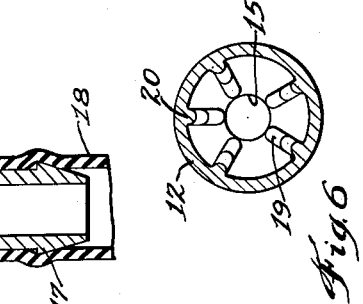

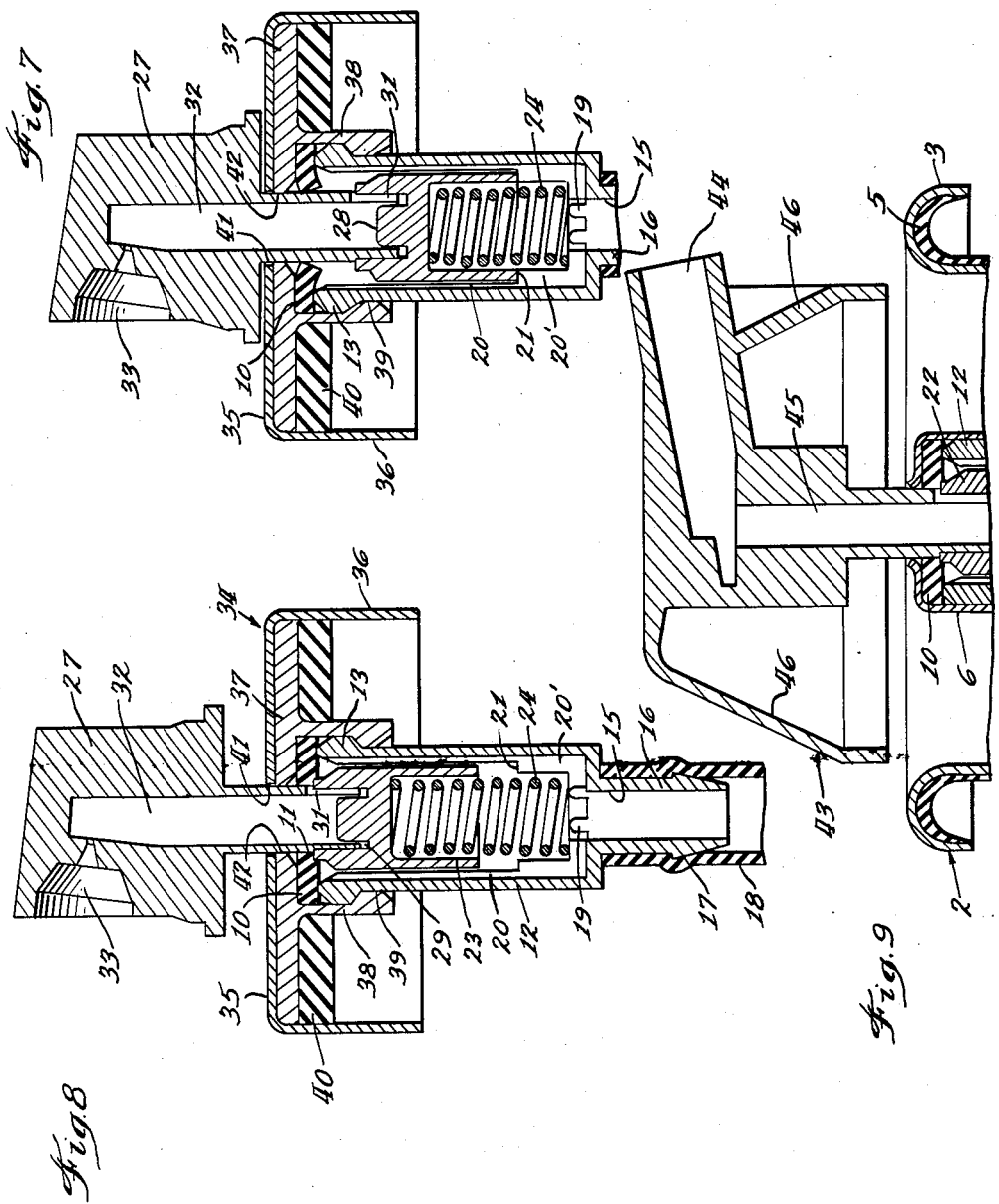

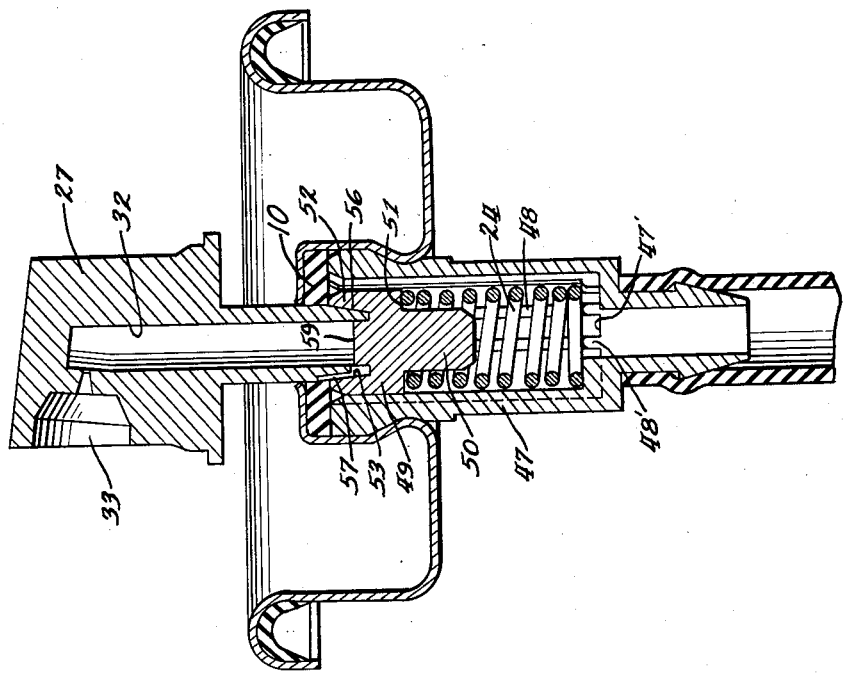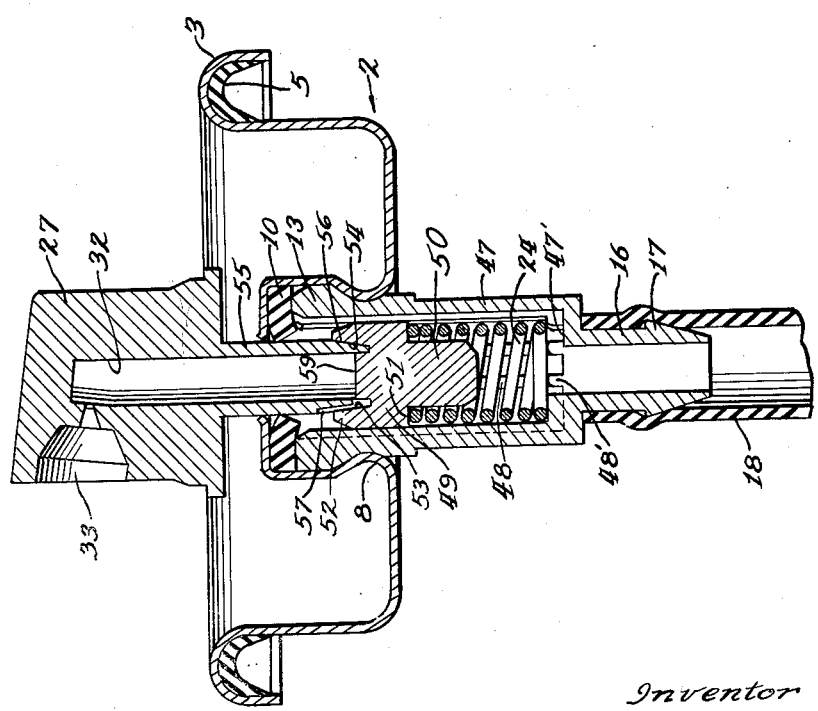

3,074,601
AEROSOL VALVE ASSEMBLY
Clarence O. Kuffer, Niles, Ill., assignor to Aerosol Research Company, Forest Park, Ill., a corporation of Illinois
Filed Sept. 17, 1959, Ser. No. 840,655
7 Claims. (Cl. 222—394)

This invention relates to an aerosol valve assembly comprising a self-sealing unit adapted to control the discharge of various types of products, such as solutions, suspensions, emulsions, dry powders, and mixtures of more than one phase, from containers in the form of a stream, a spray or a foam.

This application is a continuation-in-part of my prior application filed in the United States Patent Office on November 20, 1956, Serial No. 623,429, and now forfeited.

The container may be filled under pressure, or may be cold filled. The valve assembly of the present invention may be assembled as a unit with any suitable container, or with a mounting cup designed to be secured to the open end of a container such as a can, bottle, or similar receptacle. Preferably the parts of the valve assembly are made of plastic or rubber although the container or the mounting cup may be metal.

The valve assembly includes a removable dispensing tip which may be interchanged with a similar tip to discharge the contents of the container either in the form of a stream, a spray or as foam, depending upon the nature of the product in the container.

An illustrative valve assembly embodying the present invention includes a sealing gasket positioned adjacent the underside of the top of a container or adjacent to the underside of the top of a mounting cup secured to a container. The gasket and the mounting cup, or the container top, are provided with aligned apertures through which a tubular valve stem is inserted to cooperatively seat in a sealing plug or cup. The sealing plug or cup is spring backed and is slidably received in a tubular shell which has an open top and is secured to the mounting cup or to the container top by shoulders interengaged with shoulders projecting inwardly from the mounting cup or container top.

In accordance with the invention, the open top of a tubular shell engages the underside of the sealing gasket to provide a housing for the sealing plug, the upper edge of which is in the form of an upstanding annular flange engageable with the underside of the gasket about the aperture in the gasket to seal the contents of the container. The outside diameter of the sealing plug is less than the inside diameter of the shell for clearance between the outer surface of the sealing plug and the inner surface of the shell. This clearance permits pressure filling of the container as well as discharge of material therefrom.

The tubular shell is provided with longitudinal splines projecting inwardly to insure proper guidance and alignment of the sealing plug and provide for material flow between the outer surface of the sealing plug and the inner surface of the shell.

The sealing plug has a depending portion which cooperates with the shell to hold the spring which urges the sealing plug into sealing engagement with the gasket.

The bottom of the shell is provided with a plurality of upstanding ribs engaging the lower end of the spring to prevent the spring from sealing the bottom of the shell around the opening to a nipple depending from the shell and carrying a siphon tube which extends to the bottom of the container. Each of the ribs also extends vertically along the cylindrical wall of the tubular shell to form the vertical splines for centering the sealing plug in the shell. Each spline may be provided with an interior shoulder adapted to engage the lower edge of the depending portion of the sealing plug when said depending portion is in the form of a skirt. The shoulder limits the downward movement of the sealing plug and thereby prevents the spring from sealing (bottoming out) by engagement of its convolutions with each other.

A valve stem is integral with the removable dispensing tip and depends therefrom in the form of a tubular member having its inner surface aligned vertically with a vertical bore extending upwardly into the dispensing tip. The vertical bore communicates with a discharge opening which may be relatively small for spray dispensing, or large for foam dispensing.

The sealing plug is provided with an upstanding vertical boss spaced inwardly from the inner surface of the annular flange on the shell to provide a circular recess into which the lower end of the valve stem may be press fitted. Preferably the outer wall of the circular recess is tapered, and the outer surface of the lower end of the valve stem is correspondingly tapered to provide a tight fit between the valve stem and the sealing plug. The valve stem may be provided with a shoulder adapted to abut the upper edge of the annular flange to limit the downward movement of the valve stem relative to the sealing plug.

The lower end portion of the valve stem is provided with a vertical metering groove or slot extending partly or entirely through its wall to provide a passageway between the interior of the tubular shell and the interior of the tubular valve stem. The pressurized contents of the container flow from the tubular shell into the valve stem and through the discharge opening when the dispensing tip is depressed. In normal position the sealing plug and gasket cooperate to seal the vertical metering groove or slot. The top of the groove or slot is sealed by engagement with the inner surface of the sealing gasket, and is held in such position by the action of the spring positioned in the tubular shell and bearing against the bottom of the sealing plug. The lower end portion of the groove or slot extends entirely through the wall to provide a passageway for the fluid from the interior of the tubular shell into the valve stem when the sealing plug is depressed out of sealing engagement with the sealing gasket.

The structure by means of which the above mentioned and other advantages of the invention are attained will be described in the following specification, taken in conjunction with the accompanying drawings which show several preferred illustrative embodiments of the invention and in which:

FIGURE 1 is a side elevation of a can provided with an aerosol valve assembly embodying the invention;

FIGURE 2 is a fragmentary cross sectional view, taken along the line 2—2 of FIGURE 1, showing one embodiment of the valve in open position;

FIGURE 3 is a fragmentary cross sectional view of the valve assembly of FIGURE 2, showing the valve in closed position;

FIGURE 4 is a fragmentary perspective view of the lower end portion of one embodiment of the valve stem;

FIGURE 5 is a longitudinal sectional view of one embodiment of the tubular shell;

FIGURE 6 is a cross sectional view, taken along the lines 6—6 of FIGURE 5;

FIGURE 7 is a cross sectional view of a valve assembly adapted to be mounted on a bottle, and showing the valve in open position;

FIGURE 8 is a cross sectional view of the valve assembly of FIGURE 7, showing the valve in closed position;

FIGURE 9 is a fragmentary cross sectional view showing a foam dispensing tip;

FIGURE 10 is a cross sectional view of another embodiment of the valve assembly in accordance with the present invention;

FIGURE 11 is a view, similar to FIGURE 10, showing the valve assembly in closed position;

FIGURE 12 is a detail perspective view of an embodiment of a dispensing tip with a metering groove extending only partially through the wall of the valve stem;

FIGURE 13 is a detail perspective view of an embodiment of a sealing plug;

FIGURE 14 is a fragmentary cross sectional view, similar to FIGURE 11, showing a tapered valve stem fitting in a cylindrical recess; and FIGURE 15 is a view similar to FIGURE 14, except that the lower end portion of the valve stem is cylindrical.

In the embodiment of the invention shown in FIGURES 1-6, a mounting cup 2 is provided with a depending peripheral flange 3 adapted to be sealed to the upper edge of an opening in the top of a can 4. A suitable sealing composition 5 is applied to the inner surface of the mounting cup adjacent flange 3. The specific shape of the mounting cup is not critical, since the mounting cup may be designed to fit any particular can or similar container. In the embodiment illustrated in FIGURES 1-6, the mounting cup is provided with a center hub having a substantially vertical wall 6 and a top wall 7. Wall 6 is crimped inwardly a short distance below top wall 7 to provide an annular shoulder 8. Top wall 7 is provided with a centrally disposed aperture 9. A sealing gasket 10 positioned adjacent the underside of top wall 7 has a centrally disposed aperture 11 slightly smaller than aperture 9 and aligned therewith.

A tubular shell 12, having its upper open end fitting within the hub of mounting cup 2, is provided with an external annular shoulder 13 adjacent its upper edge. The shoulders 8 and 13 are interengaged to interlock shell 12 and mounting cup 2, with the upper edge of the shell held in sealing engagement with the underside of gasket 10 adjacent its outer edge. The bottom wall 14 of shell 12 is provided with a central aperture 15. A tubular nipple 16 depends from the edge of wall 14 defining the aperture.

Nipple 16 is provided with a sharp external shoulder 17. A siphon tube 18 having its upper end forced over the nipple is held in place by its engagement with shoulder 17. The lower end of the siphon tube terminates at a point spaced slightly above the bottom of can 4.

The bottom wall 14 of shell 12 is provided with a plurality of upstanding ribs 19 extending radially thereof. Although five ribs are shown, it will be understood that any suitable number may be used. The cylindrical wall of shell 12 is also provided with vertical splines or ribs 20 extending upwardly from ribs 19 and each having an interior shoulder 21. The purpose of the splines is to center a sealing plug 22 within the shell, with sufficient clearance between the splines to allow the contents of the can to flow around the outside of the sealing plug. Such clearance permits pressure filling of the can as well as discharge of material from the can.

A skirt 23 depending from sealing plug 22 engages shoulders 21 to limit the downward movement of the sealing cup, and also serves to confine the upper end of a coiled compression spring 24 which is seated in tubular shell 12. Ribs 19 form a seat for the bottom of spring 24 to prevent it from forming a sealing engagement with the bottom wall 14 of tubular shell 12 around the aperture 15. The lower ends of splines 20 below the shoulder 21, indicated at 20', cooperate with each other to help center the lower end of spring 24 in tubular shell 12. The spring 24 exerts a constant force against the bottom of sealing plug 22 urging it upwardly towards sealing engagement with the gasket 10. In its uppermost position the upper edge of the sealing plug 22 engages the inner edges of gasket 10 to provide a seal between the tubular shell and the valve stem.

The upper edge of sealing plug 22 is in the form of an annular flange 25 having a diameter large enough to receive the lower end of a tubular valve stem 26 integral with a dispensing tip 27. A vertical boss 28 is spaced inwardly of flange 25 to form a circular recess 29 into which the lower end of the valve stem 26 may be press fitted. The lower end of valve stem 26 is recessed to form a shoulder 30 adapted to engage the inner edge of flange 25 to move the sealing plug downwardly when the dispensing tip is depressed.

A vertical metering groove or slot 31 extends upwardly from the lower end of valve stem 26 and terminates a short distance above the shoulder 30. Since the shoulder 30 abuts the annular flange 25, the upper portion of groove slot 31 can never be sealed by the flange 25. When sealing plug 22 is in its uppermost position with flange 25 in sealing engagement with gasket 10, the upper end of metering groove or slot 31 is sealed by the inner edge of the gasket. When the dispensing tip 27 is depressed, the upper end of groove or slot 31 is moved below the lower edge of gasket 10 and provides a passageway between the interior of tubular shell 12 and the interior of the tubular valve stem 26.

Valve stem 26 is integral with dispensing tip 27 and depends therefrom in the form of a tubular member having its inner surface aligned vertically with a vertical bore 32 extending into the dispensing tip and terminating short of its top. A discharge opening 33 extends laterally through one wall of the dispensing tip and communicates with the upper end portion of vertical bore 32.

The operation of the valve assembly is very simple. When the device is completely assembled with a can, the dispensing tip may be removed and the can will remain sealed by the engagement of the upper edge of tubular shell 12 and the upper edge of the sealing plug against the underside of gasket 10. Before the dispensing tip is assembled with the rest of the valve assembly, or after removal of the tip if it has already been assembled, the contents of the can may be forced into the can under pressure by placing a filling nozzle within apertures 9 and 11 and applying pressure which forces sealing plug 22 down against the action of spring 24. The contents may then flow past the outside of sealing plug 22, into tubular shell 12, and through nipple 16 and siphon tube 18 into the can. As soon as the filling nozzle is removed from aperture 9, spring 24 will move the sealing plug upwardly into sealing engagement with gasket 10 to prevent escape of the contents.

After the dispensing tip is positioned with the lower end of the valve stem in recess 29, a downward pressure on the dispensing tip will move sealing plug 22 downwardly against the action of spring 24, and the pressurized contents will flow upwardly through tubular shell 12, around sealing plug 22, through slot 31, and into bore 32. Bore 32 forms an expansion chamber, and the contents will be forced through discharge opening 33 in the form of a fine spray.

In the other embodiments of the invention identical structure will be indicated by the same reference numerals, and the description of duplicate structure will not be repeated.

In FIGURES 7 and 8 I have shown the same valve assembly in a form adapted for use with glass bottles which are considered preferable for dispensing some materials such as, for example, perfumes, colognes, hair lacquers, and pharmaceutical compositions. In this embodiment the structure is identical with that previously described except for the mounting cup.

In the embodiment of FIGURES 7 and 8 the mounting ferrule 34 has a flat top 35 and a depending skirt 36. The skirt is preferably made of sheet metal, and is long enough to permit crimping its lower edge around a bead on the bottle (not shown) on which it is to be used. A plastic ferrule 37 is positioned against the underside of the top 35. The plastic ferrule is provided with an annular depending flange 38 concentric with and spaced inwardly from skirt 36. The flange 38 is provided with an inwardly extending annular shoulder 39 adapted to be interengaged with shoulder 13 of tubular shell 12 to interlock the valve assembly.

An annular gasket 40 fitting between skirt 36 and flange 38 is adapted to rest on the upper edge of the bottle on which the valve assembly is to be used, so that when skirt 36 of the mounting cup is crimped over the bead of the bottle it will seal the upper edge of the bottle to prevent leakage of the contents of said edge.

The mounting ferrule 34 and plastic ferrule 37 are provided respectively with apertures 41 and 42 aligned with aperture 11 of gasket 10 to permit valve stem 26 to project therethrough.

In FIGURE 9 the structure is identical with the structure of FIGURES 1 to 6 except that a foam dispensing tip 43 has been substituted for the spray dispensing tip. In this embodiment the dispensing tip is provided with a wide discharge opening 44 communicating directly with a vertical bore 45. The dispensing tip is provided with a plurality of stiffening ribs, such as 46.

In the embodiments of FIGURES 10 to 15, a tubular shell 47 is provided with radially spaced vertical splines 48, and its bottom wall 47′ is provided with upstanding ribs 48′. Splines 48 are adapted to center a sealing plug 49 in the tubular shell. Sealing plug 49 is provided with a depending portion 50 of reduced diameter to center the upper end of spring 24 and to provide an outwardly extending shoulder 51 against which the upper end of the spring is biased. The lower end of spring 24 is seated on ribs 48′ projecting upwardly from bottom wall 47′ of tubular shell 47. The outer surface of spring 24 is spaced from contact with the inner wall surface of the tubular shell by splines 48.

Even if spring 24 is compressed enough to press the adjacent convolutions of the spring into tight engagement, the pressurized fluid may flow from the container around sealing plug 49 and through the discharge outlet. When the dispensing tip is depressed the fluid flows through the space formed between bottom wall 47′ and the lower end of spring 24 by ribs 48′, and then through the space formed between the inner wall surface of the tubular shell and the outer surface of the spring by splines 48.

When the dispensing tip is not pressed down, spring 24 exerts a force against shoulder 51 to urge sealing plug 49 upwardly into sealing engagement with gasket 10. Sealing plug 49 is provided with an upstanding annular flange 52 and a circular recess 53 within the confines of the annular flange. In FIGURES 10 to 13 the outer wall of recess 53 is tapered, as indicated at 54, and the outer wall of the lower edge portion of valve stem 55 is correspondingly tapered, as indicated at 56, to provide a snug fit between the bottom of the valve stem and the top of the sealing plug.

A metering groove 57, equal in length to slot 31 in the embodiment of FIGURES 1 to 6, is provided in the lower end portion of valve stem 55. The lowermost end of groove 57 is cut entirely through the wall of the valve stem, as indicated at 58, but for most of its length it is cut only partially through said wall. Transverse cut 58 allows the fluid to flow from the container into the dispensing tip, but the decreased cross sectional area of passageway for such flow increases the accuracy of control of said fluid flow. The upper edge of passageway 58 is spaced above the top of a boss 59 that projects upwardly within the confines of circular recess 53.

When the dispensing tip is held in its normal position by spring 24, the upper end of groove 57 is sealed by gasket 10 and the engagement of upstanding flange 52 with the gasket, so that no fluid can pass therethrough. Downward pressure on the dispensing tip moves flange 52 out of sealing engagement with gasket 10 and also moves groove 57 below the gasket. The recess of groove 57 allows the pressurized fluid that has been forced upwardly through the spaces between splines 48, the inner wall surface of tubular shell 47 and the outer surface of sealing plug 49, to flow from the interior of the tubular shell through passageway 58 into the valve stem.

The embodiments of FIGURES 14 and 15 are essentially the same as the embodiment of FIGURES 10 to 13. The only difference is that the circular recess 60 in the top of sealing plug 49 is not tapered. In FIGURE 14 the lower edge portion of valve stem 55 is tapered the same as in FIGURES 10 to 13. In FIGURE 15 the lower edge portion of valve stem 55 is straight. The foam dispensing tip 43 shown in FIGURE 9 may be substituted for the dispensing tip 27 of FIGURES 10 to 15, if desired.

The operation of each of the embodiments shown in FIGURES 7 to 15 is the same as in the embodiment described in FIGURES 1 to 6.

While I have described several preferred embodiments of my invention in considerable detail, it will be understood that the description thereof is illustrative, rather than restrictive, as many details may be modified or changed without departing from the spirit or scope of my invention. Accordingly, I do not desire to be restricted to the exact structure described.

I claim:

1. In an aerosol dispenser valve of the type which is characterized by a sealing gasket of resilient material having a central aperture, a valve member beneath the gasket having a centrally located upwardly opening socket of cylindrical configuration aligned with said aperture and the upper end surface of said valve member surrounding said socket defining an annular rim, a spring normally urging said valve member upwardly to seal said annular rim against the underside of the gasket surrounding said aperture, a removable spray head having a dependent hollow stem of cylindrical exterior configuration extending downwardly from above the gasket through the aperture in slidable but peripherally sealed engagement with said aperture, said stem having its lower portion seated in the socket in a sealed engagement therewith but removable therefrom, the lower portion of the stem having a vertically extending slot opening to the bottom end of the stem of a vertical length many times greater than its width, and open along its entire length to the exterior of the stem with the upper portion extending partway into the gasket above the said annular rim, said spray head being arranged for only vertical reciprocatory movement together with said valve member against said spring to unseat said rim and permit aerosol product to pass into the upper portion of the slot above said rim and thence by way of said slot into said hollow stem; the improvement which comprises providing in said slot a web extending transversely of the slot and extending downwardly from the upper end of said slot and recessed away from the exterior of the stem to permit access from that open portion of the slot above said rim, past the web to the remainder of the slot, and the slot being open clean through to the hollow of the stem below said back wall.

2. An aerosol valve comprising, a sealing gasket of resilient material having a central aperture, a valve housing, a sealing plug in said housing and beneath the gasket and having a centrally located upwardly opening recess coaxially aligned with said aperture, the upper end surface of said sealing plug surrounding said recess defining a flange, a spring normally urging said sealing plug toward a sealing position against the underside of said gasket and surrounding said aperture, a removable dispensing tip having a tubular valve stem integral therewith and extending through said aperture in slidable but peripherally sealed engagement with said aperture, said stem having its lower end portion seated in the recess in the sealing plug in sealed engagement therewith but removable therefrom, the lower end of said stem having a longitudinally extending slot in the exterior surface thereof extending to the lower end of said stem and being open along its entire length to the exterior of the stem, with the upper portion of the slot extending above the upper end flange of said sealing plug when said stem is seated in said recess, said sealing plug having a sliding fit with the inner surface of said housing whereby said spray tip is arranged for only vertical reciprocatory movement together with said sealing plug against the biasing force of said spring to unseat said flange from said gasket and permit aerosol material to pass into the upper portion of the slot above said flange and then by way of said slot into said hollow stem, said slot having a groove configuration extending downwardly from the upper end thereof and including a back wall recessed away from the exterior of the stem to permit access from the open portion of the slot above the flange past said back wall to the remainder of said slot and said slot being open through to the hollow of said stem below said back wall.

3. An aerosol valve comprising, a sealing gasket of resilient material having a central aperture, a valve housing, a sealing plug in said housing and beneath the gasket and having a centrally located upwardly opening recess coaxially aligned with said aperture, the upper end surface of said sealing plug surrounding said recess defining a flange, a spring normally urging said sealing plug toward a sealing position against the underside of said gasket and surrounding said aperture, a removable dispensing tip having a tubular valve stem integral therewith and extending through said aperture in slidable but peripherally sealed engagement with said aperture, said stem having its lower end portion seated in the recess in the sealing plug in sealed engagement therewith but removable therefrom, the lower end of said stem having a longitudinally extending slot in the exterior surface thereof extending to the lower end of said stem and being open along its entire length to the exterior of the stem, with the upper portion of the slot extending above the upper end flange of said sealing plug when said stem is seated in said recess, said sealing plug having a sliding fit with the inner surface of said housing whereby said spray tip is arranged for only vertical reciprocatory movement together with said sealing plug against the biasing force of said spring to unseat said flange from said gasket and permit aerosol material to pass into the upper portion of the slot above said flange and then by way of said slot into said hollow stem, said slot having a groove configuration extending downwardly from the upper end thereof and including a back wall recessed away from the exterior of the stem to permit access from the open portion of the slot above the flange past said back wall to the remainder of said slot and said slot being open through to the hollow of said stem below said back wall, said recess in said sealing plug and said lower end portion of said stem both being of cylindrical configuration.

4. An aerosol valve comprising, a sealing gasket of resilient material having a central aperture, a valve housing, a sealing plug in said housing and beneath the gasket and having a centrally located upwardly opening recess coaxially aligned with said aperture, the upper end surface of said sealing plug surrounding said recess defining a flange, a spring normally urging said sealing plug toward a sealing position against the underside of said gasket and surrounding said aperture, a removable dispensing tip having a tubular valve stem integral therewith and extending through said aperture in slidable but peripherally sealed engagement with said aperture, said stem having its lower end portion seated in the recess in the sealing plug in sealed engagement therewith but removable therefrom, the lower end of said stem having a longitudinally extending slot in the exterior surface thereof extending to the lower end of said stem and being open along its entire length to the exterior of the stem, with the upper portion of the slot extending above the upper end flange of said sealing plug when said stem is seated in said recess, said sealing plug having a sliding fit with the inner surface of said housing whereby said spray tip is arranged for only vertical reciprocatory movement together with said sealing plug against the biasing force of said spring to unseat said flange from said gasket and permit aerosol material to pass into the upper portion of the slot above said flange and then by way of said slot into said hollow stem, said slot having a groove configuration extending downwardly from the upper end thereof and including a back wall recessed away from the exterior of the stem to permit access from the open portion of the slot above the flange past said back wall to the remainder of said slot and said slot being open through to the hollow of said stem below said back wall, said lower end portion of said stem and said recess in said sealing plug being correspondingly tapered.

5. An aerosol valve comprising, a sealing gasket of resilient material having a central aperture, a valve housing, a sealing plug in said housing and beneath the gasket and having a centrally located upwardly opening recess coaxially aligned with said aperture, the upper end surface of said sealing plug surrounding said recess defining a flange, a spring normally urging said sealing plug toward a sealing position against the underside of said gasket and surrounding said aperture, a removable dispensing tip having a tubular valve stem integral therewith and extending through said aperture in slidable but peripherally sealed engagement with said aperture, said stem having its lower end portion seated in the recess in the sealing plug in sealed engagement therewith but removable therefrom, the lower end of said stem having a longitudinally extending slot in the exterior surface thereof extending to the lower end of said stem and being open along its entire length to the exterior of the stem, with the upper portion of the slot extending above the upper end flange of said sealing plug when said stem is seated in said recess, said sealing plug having a sliding fit with the inner surface of said housing whereby said spray tip is arranged for only vertical reciprocatory movement together with said sealing plug against the biasing force of said spring to unseat said flange from said gasket and permit aerosol material to pass into the upper portion of the slot above said flange and then by way of said slot into said hollow stem, said slot having a groove configuration extending downwardly from the upper end thereof and including a back wall recessed away from the exterior of the stem to permit access from the open portion of the slot above the flange past said back wall to the remainder of said slot and said slot being open through to the hollow of said stem below said back wall, said back wall in said slot being of uniform thickness throughout its length.

6. An aerosol valve comprising, a sealing gasket of resilient material having a central aperture, a valve housing, a sealing plug in said housing and beneath the gasket and having a centrally located upwardly opening recess coaxially aligned with said aperture, the upper end surface of said sealing plug surrounding said recess defining a flange, a spring normally urging said sealing plug toward a sealing position against the underside of said gasket and surrounding said aperture, a removable dispensing tip having a tubular valve stem integral therewith and extending through said aperture in slidable but peripherally sealed engagement with said aperture, said stem having its lower end portion seated in the recess in the sealing plug in sealed engagement therewith but removable therefrom, the lower end of said stem having a longitudinally extending slot in the exterior surface thereof extending to the lower end of said stem and being open along its entire length to the exterior of the stem, with the upper portion of the slot extending above the upper end flange of said sealing plug when said stem is seated in said recess, said sealing plug having a sliding fit with the inner surface of said housing whereby said spray tip is arranged for only vertical reciprocatory movement together with said sealing plug against the biasing force of said spring to unseat said flange from said gasket and permit aerosol material to pass into the upper portion of the slot above said flange and then by way of said slot into said hollow stem, said slot having a groove configuration extending downwardly from the upper end thereof and including a back wall recessed away from the exterior of the stem to permit access from the open portion of the slot above the flange past said back wall to the remainder of said slot and said slot being open through to the hollow of said stem below said back wall, said back wall in said slot being of reducing thickness toward the lower end thereof.

7. In an aerosol valve assembly, a sealing gasket provided with an aperture, a tubular shell having an open upper end engaging the underside of said gasket, means holding said shell and said gasket in firm assembly with each other, said shell having a plurality of longitudinally extending shouldered splines on the inner surface thereof, a sealing plug disposed in said shell with the upper end thereof engageable with the underside of said gasket, a spring receiving recess on the underside of said plug, a depending skirt on said sealing plug containing said recess, a spring seated against the bottom of said sealing plug and partially surrounded by said skirt at its upper end and seated against radially inwardly extending ribs at the bottom of said shell, said spring biasing said sealing plug against said gasket, shoulders on said splines located in the path of movement of said skirt, said shoulders being located above said ribs so as to constitute stops limiting the downward travel of said skirt to prevent bottoming out of said spring.

References Cited in the file of this patent

UNITED STATES PATENTS

| | | |
|---|---|---|
| 2,775,483 | Treharne et al. | Dec. 25, 1956 |
| 2,777,735 | Green | Jan. 15, 1957 |
| 2,881,808 | St. Germain | Apr. 14, 1959 |
| 2,900,114 | Utz | Aug. 18, 1959 |
| 2,913,154 | Kuffer | Nov. 17, 1959 |

FOREIGN PATENTS

| | | |
|---|---|---|
| 552,876 | Belgium | Dec. 15, 1956 |